United States Patent
Kauppinen

(10) Patent No.: US 9,170,397 B2
(45) Date of Patent: Oct. 27, 2015

(54) SUPPORTING STRUCTURE FOR A MOVABLE MIRROR, METHOD FOR REDUCING THE TILTING OF A MOVABLE MIRROR, AND INTERFEROMETER

(75) Inventor: Jyrki Kauppinen, Ilmarinen (FI)

(73) Assignee: GASERA LTD., Turku (FI)

( * ) Notice: Subject to any disclaimer, the term of this patent is extended or adjusted under 35 U.S.C. 154(b) by 1133 days.

(21) Appl. No.: 13/033,860

(22) Filed: Feb. 24, 2011

(65) Prior Publication Data

US 2011/0205545 A1    Aug. 25, 2011

(30) Foreign Application Priority Data

Feb. 25, 2010   (FI) ...................................... 20105187

(51) Int. Cl.
G02B 26/06    (2006.01)
G02B 7/182    (2006.01)
G01B 9/02     (2006.01)

(52) U.S. Cl.
CPC ............ *G02B 7/182* (2013.01); *G01B 9/02061* (2013.01); *G02B 26/06* (2013.01); *G01B 2290/35* (2013.01)

(58) Field of Classification Search
CPC ........ G02B 26/02; G02B 6/3522; G02B 9/02; G09F 9/372
USPC ..................... 359/221.1, 224.1; 356/450, 477
See application file for complete search history.

(56) References Cited

U.S. PATENT DOCUMENTS

| | | | |
|---|---|---|---|
| 4,693,603 A | 9/1987 | Auth | |
| 5,675,412 A | 10/1997 | Solomon | |
| 2002/0149777 A1 | 10/2002 | Schreiber | |
| 2008/0013144 A1* | 1/2008 | Chui et al. | 359/224 |
| 2009/0116032 A1* | 5/2009 | Zara | 356/477 |
| 2010/0149542 A1* | 6/2010 | Arnvidarson | 356/450 |

OTHER PUBLICATIONS

Finnish Search Report issued in Finnish Application No. 20105187 on Oct. 21, 2010.

* cited by examiner

*Primary Examiner* — Jennifer L. Doak
(74) *Attorney, Agent, or Firm* — Buchanan Ingersoll & Rooney PC

(57) ABSTRACT

The present invention relates to a supporting structure for a movable mirror of an interferometer, the supporting structure comprising a fixed frame (11), a movable frame (12) to which the movable mirror (42) is arranged to be attachable, and at least two flexible members (13), first ends of said members (13) being fastened to the fixed frame (11) and second ends of said members (13) being fastened to the movable frame (12) in such a way that the distance between fixing points of each flexible member (13) is essentially the same and the distance between the fixing points of the first ends essentially equals the distance between the fixing points of the second ends. The supporting structure comprises support members (16) attached to at least one side of at least two flexible members (13). The invention also relates to an interferometer and a method for reducing the tilting of a movable mirror of an interferometer.

8 Claims, 3 Drawing Sheets

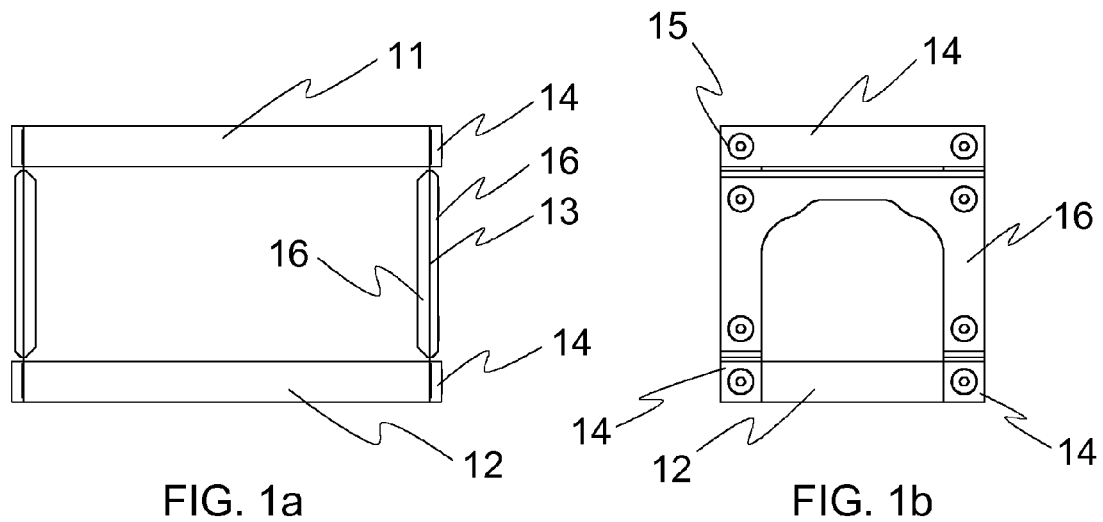
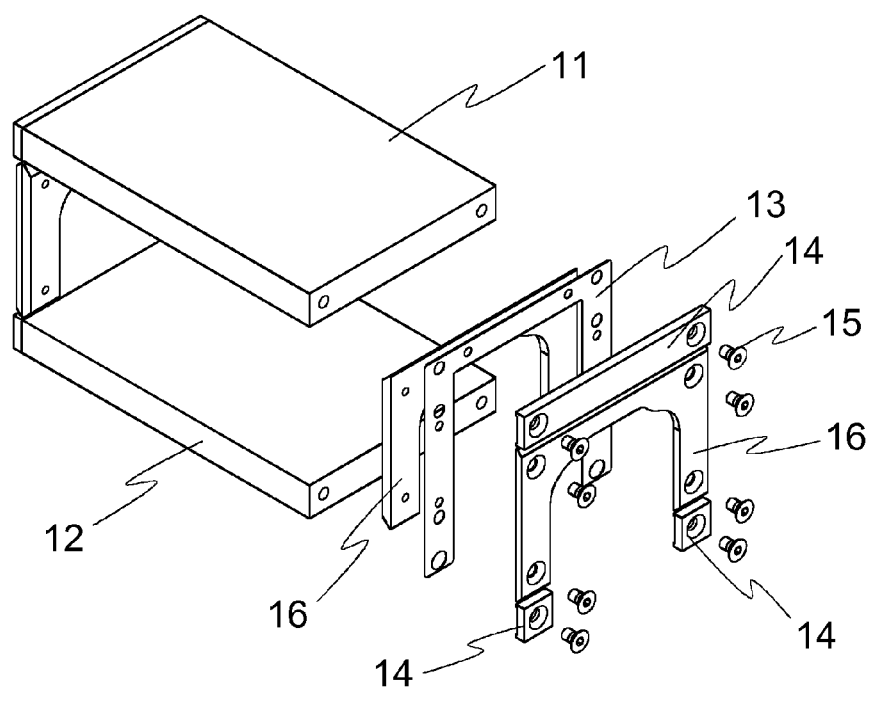

SUPPORTING STRUCTURE FOR A MOVABLE MIRROR, METHOD FOR REDUCING THE TILTING OF A MOVABLE MIRROR, AND INTERFEROMETER

TECHNICAL FIELD OF THE INVENTION

The present invention relates to a supporting structure for a movable mirror of an interferometer, a method for reducing the tilting of a movable mirror of an interferometer, and an interferometer according to the preambles of the appended independent claims.

BACKGROUND OF THE INVENTION

In an interferometer, such as a Michelson-type interferometer, a light beam coming from a light source is split into two beams by a beamsplitter. The first beam travels to a fixed mirror and the second beam to a movable mirror. After being reflected, the beams recombine and interfere at the beamsplitter. The optical path difference, i.e. the difference in the optical path lengths travelled by the first and the second beam, results in a phase difference between the beams. By moving the movable mirror in the direction of the second light beam, the phase difference between the light beams changes. This change in phase difference modulates the intensity of the interference beam which is detected by a detector.

In order to achieve high accuracy, the plane of the reflective surface of the movable mirror must be aligned perpendicular to the direction of the light beam directed to it. The perpendicular alignment must also be maintained while the movable mirror is moving. In other words, the movable mirror should be moved in such a manner that the mirror does not tilt.

Various supporting structures for a movable mirror have been described. A well-known structure, an example of which is disclosed in the document US 2002/0149777 A1, comprises a movable frame to which the mirror and a voice coil are attached. The movable frame is connected to a fixed frame by two equal length flexible members. The upper ends of the flexible members are connected to the movable frame, and the lower ends of the flexible members to the fixed frame in such a manner that the spacing between the upper fixing points equals the spacing between the lower fixing points. A permanent magnet is arranged in connection with the voice coil. By adjusting the current fed into the voice coil the distance between the voice coil and the magnet changes, whereupon the movable frame moves.

Movement of the movable frame from its rest position forces the flexible members to bend from a straight line into an S-curve. A disadvantage is that the flexible members do not bend equally whereupon the position of the movable frame relative to the horizontal plane alters. This results in the tilting of the movable mirror which decreases the accuracy of the interferometer.

OBJECTIVES OF THE INVENTION

It is the main objective of the present invention to reduce or even eliminate prior art problems presented above.

It is an objective of the present invention to provide a supporting structure for a movable mirror of an interferometer. In more detail, it is an objective to provide a supporting structure with which a mirror can be moved with minimal tilting.

It is also an objective of the invention to provide an interferometer with which high accuracy and stability can be achieved.

It is a further objective of the present invention to provide a method for reducing the tilting of a movable mirror of an interferometer.

In order to realise the above-mentioned objectives, the supporting structure, the interferometer and the method according to the invention are characterised by what is presented in the characterising parts of the appended independent claims. Advantageous embodiments of the invention are described in the dependent claims.

DESCRIPTION OF THE INVENTION

A typical supporting structure according to the invention for a movable mirror of an interferometer comprises a fixed frame, a movable frame to which the movable mirror is arranged to be attachable, and at least two flexible members, first ends of said members being fastened to the fixed frame and second ends of said members being fastened to the movable frame in such a way that the distance between fixing points of each flexible member is essentially the same and the distance between the fixing points of the first ends essentially equals the distance between the fixing points of the second ends. A typical supporting structure according to the invention comprises support members attached to at least one side of at least two flexible members.

By a fixed frame it is meant a structure which is intended to remain stationary relative to the body of an interferometer and to at least some of the optical components attached to the interferometer body. The fixed frame can be fastened to the interferometer body for example by screws. The fixed frame can have different forms and configurations. For example, the fixed frame can be a rectangular plate having a length of 60-180 mm, a width of 40-120 mm and a thickness of 5-15 mm. Typically, the fixed frame is manufactured from metal, such as aluminium, iron, copper or titanium, or metal alloy, such as stainless steel, aluminium alloy, steel or invar. In some applications the fixed frame is an integral part of the interferometer body.

By a movable frame it is meant a structure which is arranged to be movable relative to the fixed frame. The movable frame can have different forms and configurations. For example, the movable frame can be a rectangular plate having a length of 60-180 mm, a width of 40-120 mm and a thickness of 5-15 mm. Typically, the movable frame is manufactured from metal, such as aluminium, iron, copper or titanium, or metal alloy, such as stainless steel, aluminium alloy, steel or invar. Preferably, the movable frame is manufactured from the same material as the fixed frame in order to minimize the distortion caused by thermal expansion.

The movable frame is arranged in connection with the fixed frame by means of flexible members. The movement of the movable frame relative to the fixed frame is possible due to the bending of the flexible members.

Preferably, the supporting structure comprises only two flexible members. The second ends of the flexible members are preferably attached to the ends of the movable frame, and if the fixed frame has the same length as the movable frame the first ends of the flexible members are attached to the ends of the fixed frame. The flexible members can be fastened to the ends of the frames for example by gluing or by screws, or by means of fastening plates. The fastening plate is fastened, for example by screws, to the end of the frame in such a manner that the end of the flexible member is positioned between the end of the frame and the fastening plate.

The supporting structure can comprise more than two flexible members, e.g. three, four or five flexible members. The flexible members can be connected to the frames with equal distances.

Typically, the flexible member is flat, having a thickness of less than 1 mm, preferably less than 0.5 mm. The length of the flexible member can be for example 30-60 mm or 60-120 mm, and the width 4-10 mm or 10-30 mm. The flexible member can have various shapes. For example, the flexible member can be rectangular, H-shaped or U-shaped. The flexible member can be manufactured from a sheet-like material, such as an aluminium alloy or steel sheet, by cutting it into a desired shape. The flexible member can also be manufactured from plastic.

By a support member it is meant a structure which is used for supporting a flexible member, and thus reducing the flexure of the flexible member. The support member increases the rigidity of the flexible member. Without a support member, the flexible member would bend along its whole length when the movable frame is moved relative to the fixed frame. By fastening a support member into at least one side of a flexible member the bending of the flexible member can be prevented in the area covered by the support member.

The support member can be, for example, a rectangular plate. The length of the support member can be chosen so that when the flexible member is attached to the fixed and the movable frame, the gap between the frame and the end of the support member is less than 3 mm, preferably less than 2 mm, and more preferably less than 1 mm. The support member is typically as wide as the flexible member, even though in some applications the support member can be wider or narrower than the flexible member. The thickness of the support member can be, for example, 2-4 mm or 4-6 mm. The support member can be manufactured, for example, from metal or metal alloy, or from plastic. One or more support members can be fastened to a flexible member, for example, by using screws. Support members can alternatively be attached by gluing.

At a rest position of the supporting structure, the flexible members between the movable and the fixed frame are essentially straight and parallel to one another. When the movable frame is moved from its rest position, the flexible members bend. Because of the support members being attached to the flexible members, the flexible members can only bend in the area which is not supported by the support members.

An advantage of providing flexible members with support members is that the flexible members bend equally when the movable frame is moved. Therefore, the alignment of the movable frame relative to the fixed frame is maintained during the movement of the movable frame. This results in that, when a movable mirror is attached to the movable frame, tilting of the movable mirror can be avoided while moving the movable frame.

A movable mirror can be attached, for example, to an end of the movable frame. The movable frame can comprise an adjustable base for the mirror. The mirror is attached to the adjustable base for example by gluing. Preferably, the adjustable base comprises three adjusting screws for precise alignment of the mirror.

According to an embodiment of the invention the supporting structure comprises support members attached to both sides of at least two flexible members. By providing a support member to both sides of each flexible member, the movement of the movable frame is more stable. Also it is easier to fasten support members to a flexible member when they are situated in both sides of the flexible member. Preferably, the support members are similar and fastened to the flexible member symmetrically, opposite to one another.

According to an embodiment of the invention the flexible members consist of adjacent strips. Each flexible member can comprise e.g. two strips arranged side by side having a gap therebetween. The strips can have a width of 2-50 mm. The gap between the strips can be, for example, in the range of 10-60 mm. The flexible member can alternatively comprise more than two strips, for example three, four or five strips.

According to an embodiment of the invention the support members are rectangular and planar in shape.

According to an embodiment of the invention each support member is essentially centred relative to the fixing points of the flexible member. In other words, the distance between the first fixing point and the support member equals the distance between the second fixing point and the support member. By arranging the support members essentially centred, the flexible member has two equal length bendable portions.

According to an embodiment of the invention the length of the support member is at least 60 percent of the distance between the fixing points of the flexible member. The length of the support member is measured in the direction extending from the first fixing point to the second fixing point of the flexible member. Preferably, the length of the support member is at least 70 percent, at least 80 percent, or at least 90 percent of the distance between the fixing points. The longer the support member is relative to the distance between the fixing points, the more the bendable portions of the flexible member bend in order to achieve a desired movement.

According to an embodiment of the invention the flexible members and the support members are manufactured from the same material in order to minimize the distortion caused by thermal expansion.

According to a preferred embodiment of the invention the support members are an integral part of the flexible member. In other words, the flexible member is formed in one piece with the support members. The one-piece assembly can be manufactured by an injection or compression moulding process, or machined from a billet into a desired shape.

A typical interferometer according to the invention comprises a light source for emitting light, a movable mirror attached to a movable frame, the movable frame being connected by at least two flexible members to a fixed frame, first ends of said members being fastened to the fixed frame and second ends of said members being fastened to the movable frame in such a way that the distance between fixing points of each flexible member is essentially the same and the distance between the fixing points of the first ends essentially equals the distance between the fixing points of the second ends, a reference mirror, and a beamsplitter for splitting the light received from the light source for the movable mirror and for the reference mirror, and for splitting the light reflected from the movable mirror and from the reference mirror. A typical interferometer according to the invention comprises support members attached to at least one side of at least two flexible members.

The movable mirror is arranged to the movable frame in such a way that the plane of the reflective surface of the mirror is perpendicular to the direction of the light beam directed to the mirror. When the movable frame is moved in order to change the optical path difference between interferometer arms, the alignment of the mirror is maintained. In other words, the tilting of the movable mirror can be avoided.

According to an embodiment of the invention the interferometer comprises driving means for moving the movable frame. The driving means can comprise, for example, a precision motor, such as a voice coil motor, for moving the frame.

A typical method according to the invention for reducing the tilting of a movable mirror of an interferometer, the movable mirror being attached to a movable frame which is connected by at least two flexible members to a fixed frame, first ends of said members being fastened to the fixed frame and second ends of said members being fastened to the movable frame in such a way that the distance between fixing points of each flexible member is essentially the same and the distance between the fixing points of the first ends essentially equals the distance between the fixing points of the second ends, comprises stiffening structurally the flexible members in their longitudinal direction for a length of at least 60 percent of the distance between the fixing points of the flexible member.

According to an embodiment of the invention the stiffening is achieved by attaching support members to at least one side of at least two flexible members.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIGS. 1a-1c illustrate a supporting structure according to an embodiment of the invention.

DETAILED DESCRIPTION OF THE PREFERRED EMBODIMENTS OF THE INVENTION

Figure 2A:
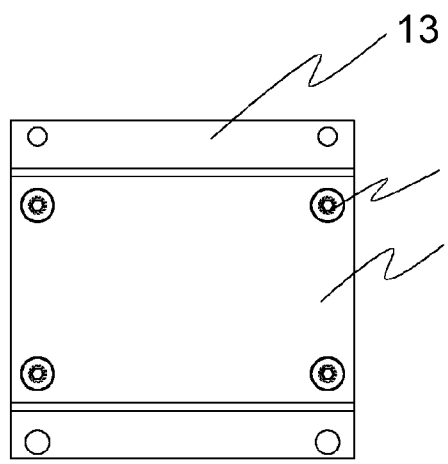
FIGS. 2a-2e illustrate variants of the flexible and support member combinations.

FIGS. 1a-1c illustrate a supporting structure according to an embodiment of the invention. FIG. 1a shows a side view and FIG. 1b an end view of the supporting structure. A perspective partially exploded view of the supporting structure is shown in FIG. 1c.

The supporting structure comprises a fixed frame 11 and a movable frame 12 to which a movable mirror can be attached. The supporting structure is illustrated in a position where the movable frame 12 is below the fixed frame 11. This is a so-called hanging position of the supporting structure. The supporting structure could also be used in a reversed position where the movable frame 12 is above the fixed frame 11.

The fixed frame 11 and the movable frame 12 are rectangular plates which are arranged in parallel to each other by means of two flexible members 13. The flexible members 13 have a flat U-shaped structure.

The ends of the flexible members 13 are attached to the ends of the fixed frame 11 and the movable frame 12 by means of fastening plates 14. The fastening plates 14 are fastened by screws 15 to the end of the frames 11, 12 in such a manner that the flexible member 13 is positioned between the end of the frame 11, 12 and the fastening plate 14.

The flexible members 13 are supported by support members 16 which are attached to both sides of the flexible members 13. Like the flexible members 13, the support members 16 are also U-shaped. The support members 16 are fastened to each other by screws 15 in such a way that the flexible member 13 is situated therebetween. Because of the support members 16 the bending of the flexible member 13 can be prevented in the area covered by the support members 16.

The distance between the fixing points in the fixed frame 11 is essentially the same as the distance between the fixing points in the movable frame 12. Therefore, the alignment of the movable frame 12 relative to the fixed frame 11 is maintained during the movement of the movable frame 12.

FIGS. 2a-2e illustrate examples of other possible combinations and shapes of the flexible and support members. The support members 16 are attached to both sides of the flexible member 13 but only one side is shown in the figures.

FIG. 2a illustrates a first example wherein both the flexible member 13 and the support members 16 have a rectangular shape. The support members 16 are fastened to the flexible member 13 by screws 15.

Figure 2B:
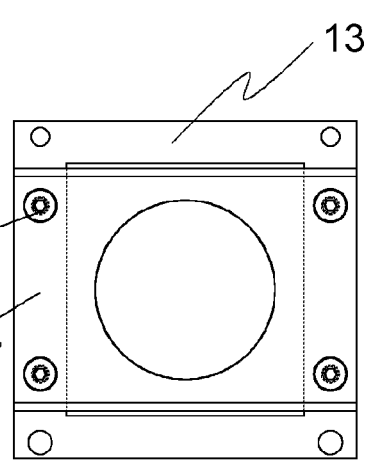

FIG. 2b illustrates a second example wherein the flexible member 13 has a rectangular aperture (illustrated by a dashed line). The support members 16 have a round aperture.

Figure 2C:
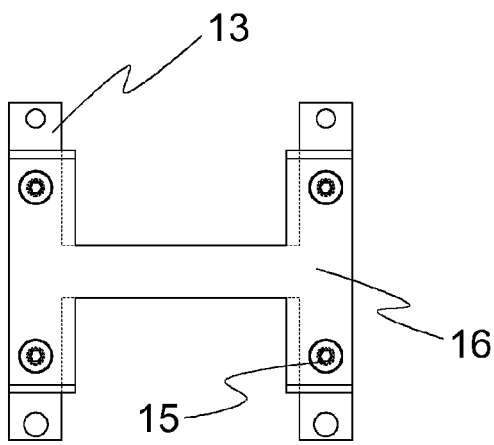

FIG. 2c illustrates a third example wherein the flexible member 13 is H-shaped. The support members 16 are also H-shaped in this example.

Figure 2D:
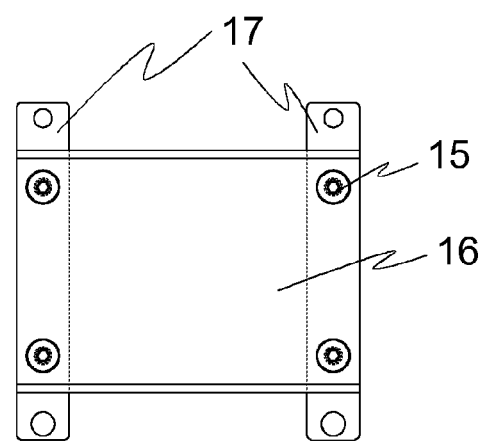

FIG. 2d illustrates a fourth example wherein the flexible member 13 comprises two parallel strips 17 having a gap therebetween. The support members 16 have a rectangular shape.

Figure 2E:
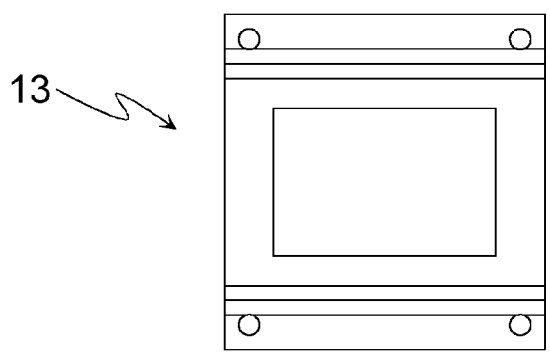

FIG. 2e illustrates a fifth example wherein the support members 16 are an integral part of the flexible member 13. The one-piece assembly has a rectangular aperture in the centre. Both a front view and a side view of the one-piece assembly are shown in FIG. 2e.

Figure 3:
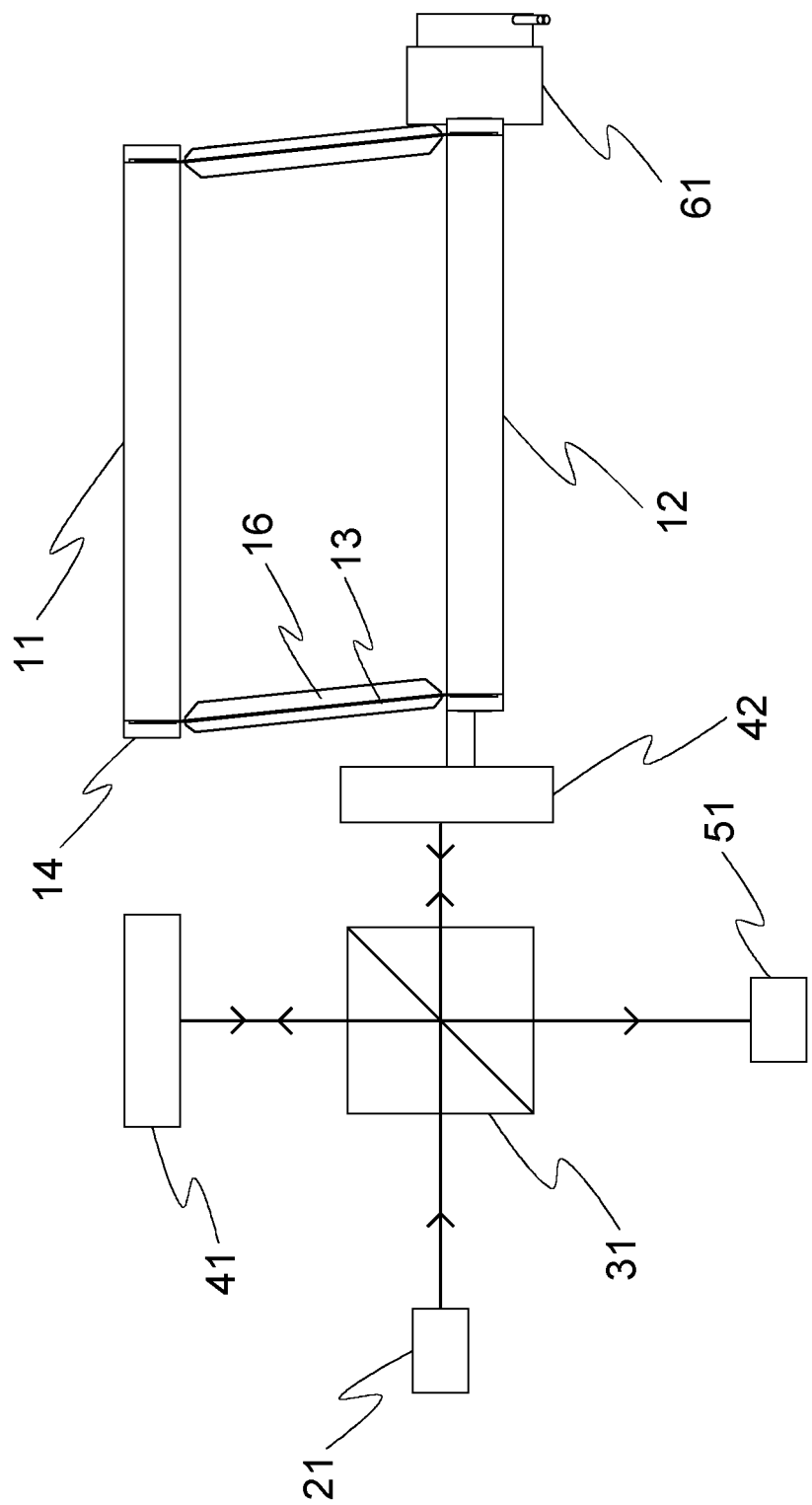
FIG. 3 illustrates an interferometer according to an embodiment of the invention.

FIG. 3 illustrates an interferometer according to an embodiment of the invention. The interferometer is a Michelson-type interferometer which comprises a supporting structure according to FIGS. 1a-1c.

The interferometer comprises a light source 21 for emitting a light beam to a beamsplitter 31 which splits the light beam into two light beams. The first light beam is directed to a fixed reference mirror 41 from where it is reflected back to the beamsplitter 31.

The second light beam is directed to a movable mirror 42 which is attached to the movable frame 12 of the supporting structure. The movable mirror 42 is attached to a first end of the movable frame 12 in such a way that the plane of the reflective surface of the mirror 42 is perpendicular to the direction of the second light beam.

The second light beam is reflected from the movable mirror 42 back to the beamsplitter 31.

The reflected light beams are recombined at the beamsplitter 31 and the light beam is then detected by a detector 51.

The interferometer comprises a voice coil motor 61 for moving the movable frame 12 of the supporting structure. The voice coil motor 61 is attached to a second end of the movable frame 12. By adjusting the current fed into the voice coil the movable frame 11 and therefore the movable mirror 42 which is attached to the frame 12 is moved.

By moving the movable mirror 42, the phase difference between the first and the second light beam changes. This change in phase difference modulates the intensity of the interference beam which is detected by the detector 51.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A supporting structure for a movable mirror of an interferometer, the supporting structure comprising:
   a fixed frame,
   a movable frame to which the movable mirror is arranged to be attachable,
   at least two flexible members, first ends of said members being fastened to the fixed frame and second ends of said members being fastened to the movable frame in such a way that the distance between fixing points of the first and second ends of each flexible member is essentially the same and the distance between the fixing points of the first ends essentially equals the distance between the fixing points of the second ends, and
   fastening plates for fastening the flexible members to the ends of the fixed frame and the movable frame;
   wherein the supporting structure comprises support members for reducing the flexure of the flexible members, the support members being attached to front and back sides of each of at least two flexible members, each support member being essentially centred relative to the fixing points of the first and second ends of the flexible member.

2. The supporting structure according to claim 1, wherein the flexible members are adjacent strips.

3. The supporting structure according to claim 1, wherein the support members are rectangular and planar in shape.

4. The supporting structure according to claim 1, wherein the length of the support member is at least 60 percent of the distance between the fixing points of the flexible member.

5. The supporting structure according to claim 1, wherein the flexible members and the support members are manufactured from a common material.

6. The supporting structure according to claim 5, wherein the support members are an integral part of the flexible member.

7. An interferometer, comprising:
   a light source for emitting light,
   a movable mirror attached to a movable frame, the movable frame being connected by at least two flexible members to a fixed frame, first ends of said members being fastened to the fixed frame and second ends of said members being fastened to the movable frame in such a way that the distance between fixing points of the first and second ends of each flexible member is essentially the same and the distance between the fixing points of the first ends essentially equals the distance between the fixing points of the second ends,
   fastening plates for fastening the flexible members to the ends of the fixed frame and the movable frame;
   a reference mirror, and
   a beamsplitter for splitting the light received from the light source for the movable mirror and for the reference mirror, and for splitting the light reflected from the movable mirror and from the reference mirror;
   wherein the interferometer comprises support members for reducing the flexure of the flexible members, the support members being attached to front and back sides of each of at least two flexible members, each support member being essentially centred relative to the fixing points of the first and second ends of the flexible member.

8. The interferometer according to claim 7, wherein the interferometer comprises a precision motor for moving the movable frame.

* * * * *